UNITED STATES PATENT OFFICE.

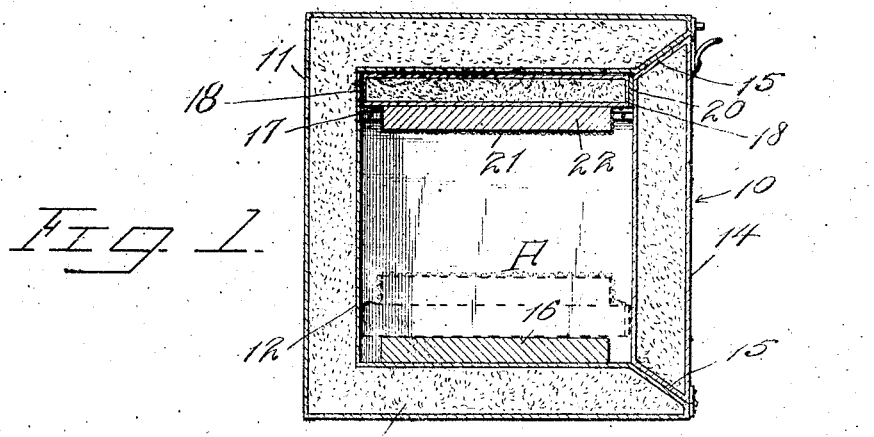

ARTHUR K. WHITMER, OF CANTON, OHIO.

FIRELESS COOKER.

1,049,633. Specification of Letters Patent. Patented Jan. 7, 1913.

Application filed September 30, 1910, Serial No. 584,689. Renewed August 8, 1912. Serial No. 714,133.

*To all whom it may concern:*

Be it known that I, ARTHUR K. WHITMER, a citizen of the United States, residing at Canton, in the county of Stark and State of Ohio, have invented certain new and useful Improvements in Fireless Cookers, of which the following is a specification.

This invention relates to heat insulating devices known as "fireless cookers," and has for its object to effect an improvement in these devices whereby their operation may be made more economical and more efficient.

To appreciate the aim of the invention fully, it is necessary to consider that the object of all such devices is to reduce to a minimum the expenditure of energy in the production of heat for cooking the food, and the attention needed. The first steps in this direction consisted in providing receptacles wherein the food, after being heated to a proper degree, could be insulated against the loss of the heat thus imparted, and it would be cooked without the application of more heat. This was sufficient for the treatment of some foods which were adapted to absorb sufficient heat to complete their reduction to an edible state, but was not operative for the preparation of foods having little water therein, or having large air spaces in or therearound, such as chicken, biscuits, etc., nor was it practicable where a roasting or browning effect was desired. Therefore an important feature was shortly introduced, consisting in the introduction of heater elements consisting of bodies or plates of material best suited for absorbing and slowly radiating heat, which were disposed below and above the food space in the cookers, and were removable to be heated and returned when food was to be cooked.

The present invention is an improvement in the last named development in the art.

It will be well appreciated by those versed in this art that with the cookers utilizing heater elements, when it is desired to prepare a food by the action of the heat contained therein, the presence of the heater elements would defeat this purpose, by such rapid absorption of the heat that the food would become quickly chilled. If the heaters are removed there is a possibility that they will be lost or misplaced and it is undesirable to separate them from the cooker in this way. More objectionable still, when they are removed a space is left around the food receptacle, the air in which will itself absorb a large quantity of heat from the food, checking its cooking. If the heater elements are warmed to prevent their absorption of heat from the food, the primary objects of the fireless cooker are defeated, as less heat energy might be required to complete the cooking of the food upon a stove than to heat it and the heater elements also.

It is therefore a most important object of this invention to provide a cooker wherein provision is made for either cooking food by absorbed heat alone, or in conjunction with heater elements, without the necessity of separating the elements from the cooker.

Other objects and advantages will be apparent from the following description, and from the drawings, in which, Figure 1 is a cross section of a fireless cooker equipped with this invention, using two heater elements, Fig. 2 is a vertical longitudinal section of the cooker with both heater elements inoperative, Fig. 3 is a vertical cross section of a modified cooker, Fig. 4 is a similar view of a further modification of cooker and heater-insulator.

Referring to the drawings, there is shown an insulated chamber member or fireless cooker 10, which may be formed in any suitable manner, but as shown consists of the exterior casing 11 and the interior casing 12 within which is the chamber A, the space between the casings being filled with suitable non-heat-conducting material 13. The cooker is open at one side, the beveled-edge door 14 fitting snugly into conforming sides 15 of the entrance, the door itself comprising a casing filled with insulating material and being hinged at the lower edge of the cooker. There is provided one heater element 16 which may be of the usual type, and which is disposed upon the floor of the chamber. Supported upon suitable flange guides 17 fixed to the sides of the chamber, there is a heater-insulator 18, filled with suitable insulating material, or having a vacuum as a mechanical equivalent, and slidable upon the guides 17, being of proper area and shape to fit snugly between the sides of the chamber and against the door when closed. A suitable packing strip 20 is carried around the edges of the insulator to facilitate its snug engagement with the sides of the chamber without binding, and to insulate it against conduction of heat to the chamber walls when in use. A wire netting or cage 21 is secured to the lower side of the insulator 18 spaced from the sides, and carried in this cage there is a heater element 22 of soapstone. This material may be replaced if desired by aluminum or other suitable material, and it may be found desirable to use other means than the cage 21 for holding such to the insulator, one method being illustrated in Fig. 4.

In use, if a roast is to be made, or food baked, either or both heaters may be used. If both, the one 16 is disposed upon the floor of the chamber and the other, 22, being suspended by the insulator in the upper part of the chamber, as shown in Fig. 1, the insulator being engaged upon the guides 17. If but one heater is required, the one 22 is warmed, and then disposed over the cold heater 16 in the bottom of the chamber the insulator being disposed downwardly upon the cold heater to support the warm one and prevent transference of its heat to the cold element. Illustrated in dotted outline in Fig. 1. If it is desired to cook food by the heat contained therein both heaters are disposed in the lower portion of the chamber, the one 22 being superposed, with the insulator uppermost, and the food receptacle may be placed thereover. Thus the food is insulated from the cold heater elements and the full advantage obtained from its contained heat. See Fig. 2. In each of these operations the size of the food receiving space is maintained the same, so that no superfluous air is left to take up the heat of the food.

The method of attaching the soapstone heater to the insulator insures it against damage and wear, and its combination with the insulator facilitates its handling and also economizes heat while it is being warmed upon a stove. A considerable amount of heat is ordinarily lost by radiation during the heating operation with the ordinary elements, and by this improved method the warming operation is considerably shortened.

It will of course be understood that each heater element employed may be provided with the insulator portion, this being a matter of mechanical decision, which it is not deemed necessary to illustrate.

In Fig. 3 there is shown a modification of the cooker in which a second set of supporting flange guides 17' is disposed beneath the upper set 17, and as shown, when it is desired to dispose both heater elements in inoperative position, the heater-insulator is simply inverted and disposed upon the lower guides, and the heater 16 disposed thereover.

In Fig. 4 a further modification is shown, in which the cooker opens at the top and is closed by means of a cover 14' similar in form to the door 14, but requiring no hinges, the construction of the remainder of the device being the same as that first described. In this form of cooker the heaters are arranged to be lifted, by the provision of suitable recesses 24, in the heater portions, whereby a stove lifter may be inserted for their removal or replacement when hot, and a ring 25 is carried by the insulator 18 for lifting thereof.

What is claimed is:

1. In an appliance of the class described, the combination with an insulated chamber member of a heater element movable therein, an insulator element attached to said heater element and adapted to insulate the heater element from a portion of the chamber.

2. In an appliance of the class described, the combination with an insulated chamber member of a heater element removably disposed therein, an insulator element attached to said heater element and adapted to insulate the heater from a portion of the chamber, the heater and insulator elements being reversible in position with respect to the vertical to allow passage of heat from the heater element to an adjacent food receptacle at times, and to prevent access of heat to the heater element from a food receptacle at other times.

3. A cooking appliance comprising an insulated chamber member, an insulator member removably disposed therein, a heater element carried on one side of said insulator member and adapted to be presented toward a food receptacle in the chamber at times, the insulator member being reversible for interposition between such food receptacle and the heater element at other times.

4. A cooking appliance comprising an insulated chamber device, supports therein, an insulator member removably carried thereby, and a heater element carried on one side of the insulator member to be presented toward food in the chamber at times, the insulator member being movable for interposition between the heater element and food in the chamber, for the purpose described.

5. An adjunct of fireless cookers of the class described comprising an insulator element, a cage carried on one side thereof, and a heater element of soapstone or the like carried in the cage, for protection, and for the other purposes described.

6. In a device of the class described, the combination with an insulated chamber device of a heater element, an insulator element movable in the chamber a heater element carried by said insulator element, the heater elements being adapted to be disposed in opposed spaced relation at times, the insulator element being movable to isolate one or both heater elements from food in the chamber.

In testimony whereof I affix my signature in presence of two witnesses.

ARTHUR K. WHITMER.

Witnesses:
J. P. FAWCETT,
JOS. M. BLAKE.